Figure 1:
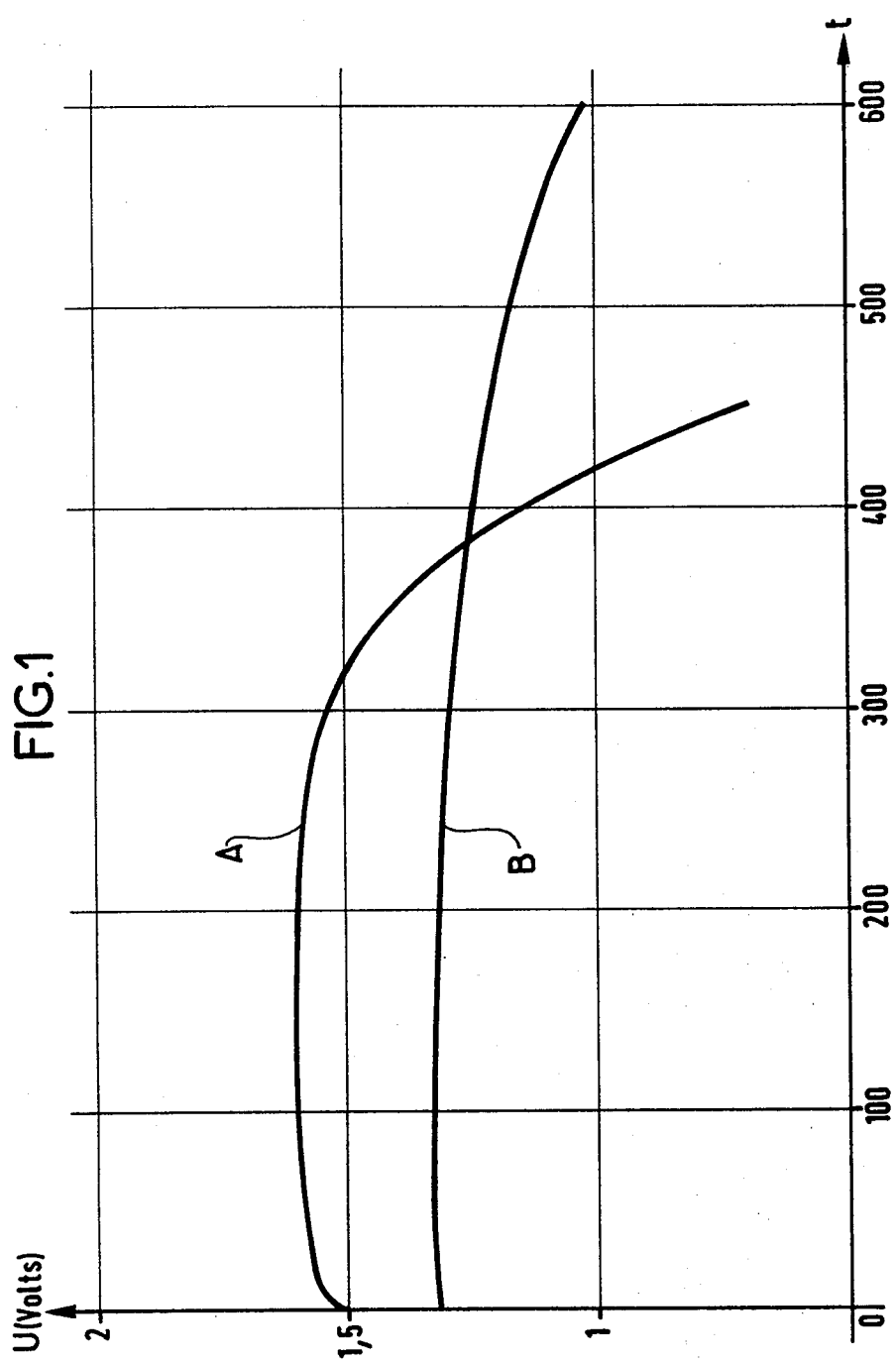

United States Patent [19]

Broussely et al.

[11] 4,271,243

[45] Jun. 2, 1981

[54] POSITIVE ACTIVE MATERIAL FOR AN ELECTRICAL CELL

[75] Inventors: Michel Broussely; Sylvie Baudry, both of Poitiers, France

[73] Assignee: Saft Leclanche, Poitiers, France

[21] Appl. No.: 117,793

[22] Filed: Feb. 1, 1980

[30] Foreign Application Priority Data

Feb. 14, 1979 [FR] France .............................. 79 03773
Jan. 16, 1980 [FR] France .............................. 80 00898

[51] Int. Cl.$^3$ .......................................... H01M 4/62
[52] U.S. Cl. .................................. 429/194; 429/232; 252/182.1; 106/53
[58] Field of Search ............... 429/232, 225, 220, 194, 429/197; 252/182.1; 106/52, 53

[56] References Cited

U.S. PATENT DOCUMENTS

| | | | |
|---|---|---|---|
| 2,962,540 | 11/1960 | Kordesch | 429/232 |
| 3,117,032 | 1/1964 | Panzer | 429/194 |
| 3,826,660 | 7/1974 | Wylot et al. | 106/53 |
| 3,982,918 | 9/1976 | Frieser et al. | 106/53 |
| 4,048,402 | 9/1977 | Kronenberg | 429/194 |
| 4,073,657 | 2/1978 | Davis et al. | 106/53 |
| 4,172,927 | 10/1979 | Toyoguchi et al. | 429/220 |

*Primary Examiner*—Donald L. Walton
*Attorney, Agent, or Firm*—Kenyon & Kenyon

[57] ABSTRACT

The invention relates to a positive active material for an electric cell. Such an active material is constituted by a vitreous compound which results from the addition of a small quantity of silica to at least one electrochemically reducible metal oxide. Application to electric cells with non-aqueous electrolyte, the negative electrodes of these cells being based on an alkali or alkali-earth metal.

9 Claims, 3 Drawing Figures

POSITIVE ACTIVE MATERIAL FOR AN ELECTRICAL CELL

The present invention relates to a positive active material for an electric cell.

Preferred embodiments of the present invention provide new types of positive active material for electric cells, it being possible to use said types of active material in combination with a non-aqueous electrolyte which is liquid at ordinary temperatures and pressures and with a negative active material constituted by an alkali or alkali-earth metal, in particular lithium.

The present invention comprises a positive active material for an electric cell with a non-aqueous electrolyte which is liquid at ordinary temperatures and pressures, said active material being constituted by a vitreous compound which results from the addition of a small quantity of silica to at least one electrochemically reducible metal oxide.

It is known that silica $SiO_2$ is capable of combining with metal oxides to form vitreous or glassy compounds, i.e. substances which are distinguished firstly from molecular compounds and from mixtures by continuity in the chemical links throughout their volume and secondly from crystallized compounds by the fact that no periodic structure is perceptible therein by radiocrystallographic techniques.

The applicant has discovered that electrochemically reducible metal oxides can be incorporated in such vitreous compounds not only while maintaining the electrochemical activity of these oxides, but also while improving some of their qualities. Since silica itself is not electrochemically active, it is advantageous to use a small quantity thereof, namely a quantity close to the minimum necessary to obtain the vitreous structure. The quantity of silica can be about 10% of the weight of the glass or even less.

The active materials in accordance with the invention must not be mistaken for the metal silicates which it has already been proposed to use as positive materials in electric cells with non-aqueous electrolytes. These silicates are crystallized compounds.

The vitreous compound which constitutes the active material in accordance with the invention may result in particular from the addition of a small quantity of silica to a greater quantity of lead oxide. In such a case, there has been observed a higher discharge voltage than for the crystallized lead oxide.

The vitreous compound may also result from the addition of a small quantity of silica to a greater quantity of lead oxide and at least one other oxide, e.g. bismuth oxide. (The term 'greater quantity' is used to designate a quantity which, in all, exceeds half the weight of the glass, the proportion of each of the ingredients considered being at least about 20% of the weight of the glass).

In accordance with another variant, the vitreous compound can result from the addition of a small quantity of silica to a greater quantity of copper oxide CuO and of bismuth oxide $Bi_2O_3$, in proportions of at least about one molecule of $Bi_2O_3$ for one molecule of CuO. Preferably, the proportion chosen is about one molecule of $Bi_2O_3$ for one molecule of CuO.

Further, the vitreous compound can include a small quantity, i.e. about 10% or less, of chromium oxide.

The invention also provides an electric cell which includes a positive electrode, a non-aqueous electrolyte which is liquid at ordinary temperatures and pressures and a negative electrode based on an alkali or alkali-earth metal, in which the positive electrode contains an active material according to the invention. The electrolyte is, for example, a solution of at least one salt in at least one organic solvent.

Figure 2:
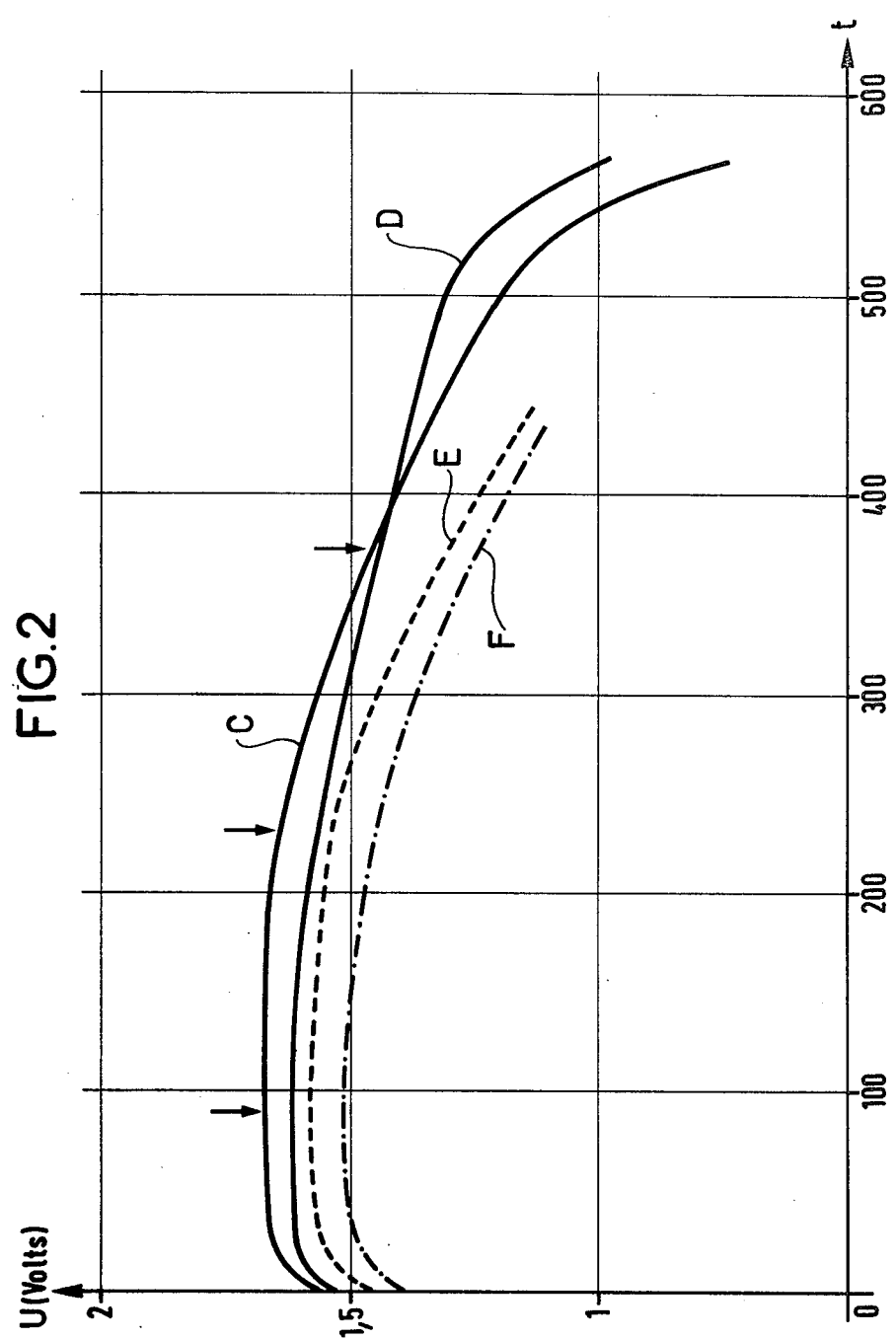
Figure 3:
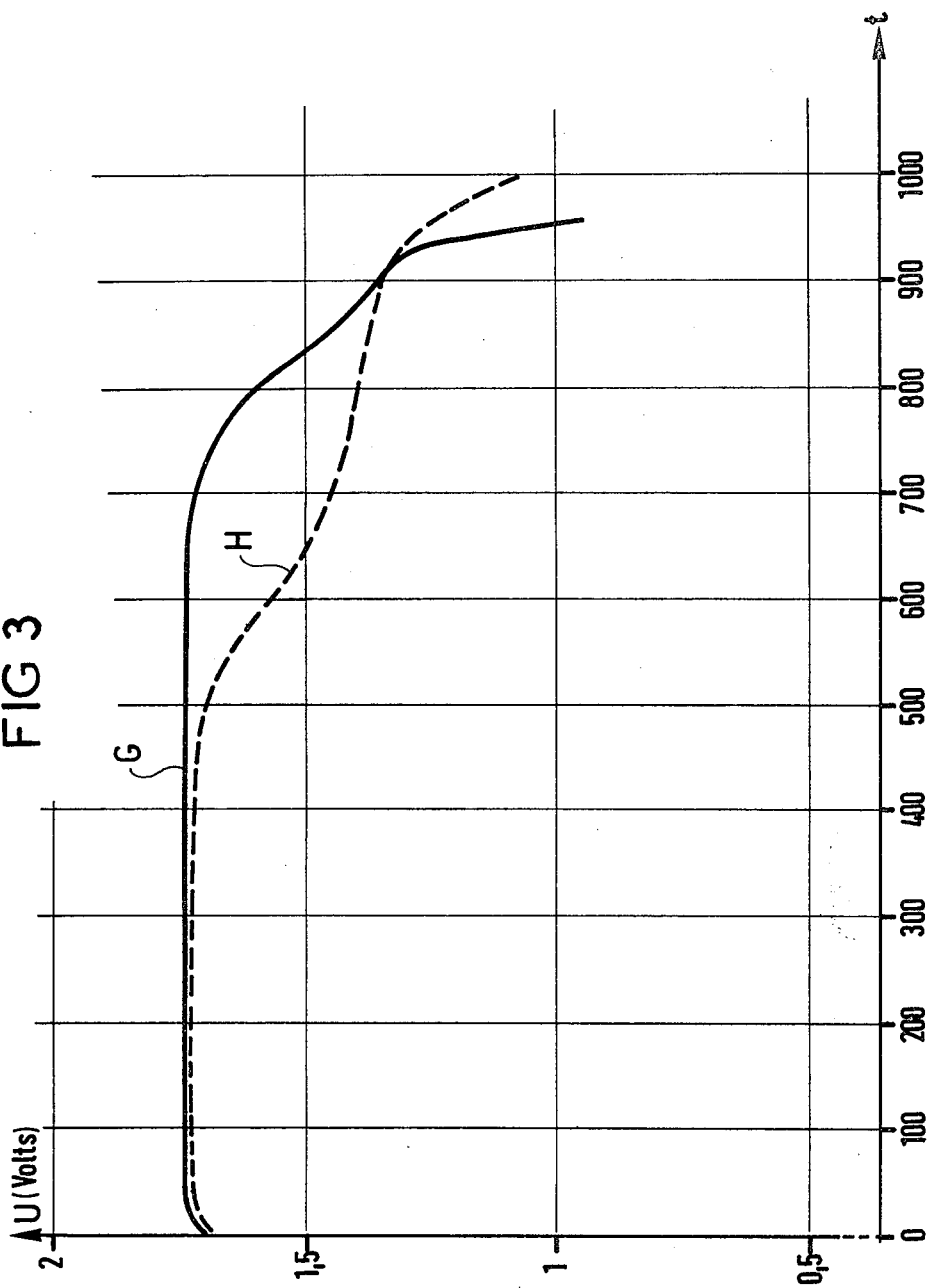

The invention will be better understood from the embodiments described hereinafter by way of non-limiting illustrations and with reference to the accompanying drawings in which FIGS. 1 to 3 are discharge curves of electric cells in accordance with the invention and, by way of comparison, discharge curves of cells in accordance with the prior art.

FIG. 1 relates to discharge curves of a primary cell which contains a glass made of PbO and of SiO (cell A) as its positive active material and, by way of comparison, of a primary cell which contains PbO as its positive active material (cell B). These cells are type 44 button-type cells (diameter 11.4 mm, height 5.35 mm). The first of them contains a glass made of 90% PbO and 10% $SiO_2$ by weight as its positive active material; 650 mg of positive mass constituted by 90% of said glass and 10% of lead powder as a conductor are compressed under 1.2 tonnes on a collector to form the positive electrode. The negative electrode contains a quantity of lithium whose capacity exceeds the positive capacity. The electrolyte is a 2 M solution of lithium perchlorate in dioxolane. The second cell contains 1.07 grams of a positive mass made of 77% of PbO and 23% of lead compressed under about 5 tonnes. Again, there is an excess quantity of lithium and the electrolyte is the same as previously.

These two cells are discharged through a resistance of 5000 ohms. Curves A and B in FIG. 1 are the discharge curves obtained respectively for each cell (voltage U in volts as a function of the duration t of the discharge in hours). The discharge voltage of the glass cell is appreciably higher than that of the crystallized lead oxide cell. For an end voltage of 1.2 V, it delivers practically the theoretical capacity which corresponds to the complete reduction of the lead (123 mAh for a theoretical capacity of 126 mAh). For the same voltage, the reference cell provides only 120 mAh for a theoretical capacity of 198 mAh.

The active material of the cell which corresponds to curve C in FIG. 2 (cell C) is made of glass consisting of $Bi_2O_3$, PbO and $SiO_2$, with a proportion of $SiO_2$ of 5% by weight. The atomic ratio between the bismuth and the lead is equal to 1, so that it may be considered that the glass is a product of the addition of $SiO_2$ and lead bismuthate $Bi_2Pb_2O_5$. The cell contains 750 mg of positive mass which includes 10% by weight of lead powder, the other conditions being the same as for the cell which corresponds to the curve A of FIG. 1 (cell A).

The cell whose discharge is represented by curve D in FIG. 2 (cell D) differs from cell C in that its active material is crystallized lead bismuthate $Bi_2Pb_2O_5$.

These two cells were discharged through resistances of 5000 ohms, with peaks of 1 second at 1 milliamp, these peaks being indicated by arrows in the figure. Curves C and D represent the variation in time of the voltage of the cells during the discharge through the resistances. Curves E and F represent respectively for each cell the voltage measured just after the peaks.

Here again, the voltage at the beginning of discharge is higher for the glass cell than for the other cell, both on the level and during peaks. The capacity obtained for an end voltage of 1.2 V is 146 mAh (i.e. 77.5% of the theoretical capacity corresponding to the total reduction of Bi and Pb) for the cell C and 160 mAh (80.7% of the theoretical capacity) for the cell D. The peak voltage of the glass cell C remains higher than that of cell D up to the end voltage.

A cell has also been produced whose positive active material is made of glass containing 5% of $Cr_2O_3$, the complement being constituted by $Bi_2O_3$, PbO and $SiO_2$ in the same relative proportions as in the cell C. The addition of $Cr_2O_3$ has had no perceivable effect on the discharge curve of the cell.

FIG. 3 illustrates discharge curves of a cell G in accordance with the invention and of a reference cell H in accordance with the prior art, the positive active material of the cell being crystallized.

These cells are button-type cells with a diameter of 11.4 mm and a height of 3.5 mm. The positive active material in accordance with the invention is a glass made of 92.5% copper bismuthate $CuBi_2O_4$ and 7.5% silica $SiO_2$. A positive mass constituted by 90% by weight of said glass and by 10% of lead powder as an electron conductor is compressed on a collector to form the positive electrode. The negative electrode has excess lithium with respect to the capacity of the positive electrode. The electrolyte is a molar solution of lithium perchlorate in a mixture of one volume propylene carbonate to one volume dimethoxyethane. The reference cell H is made using crystallized $CuBi_2O_4$ as the positive active material.

These two cells were discharged through resistances of 5000 ohms. For an end voltage of 1 volt, they delivered capacities of 110 and 109 mAh respectively, i.e. 91 and 87% of the theoretical capacity. The specific energy obtained is 517 and 495 $Wh/cm^3$.

It is apparent that the initial discharge level of the cell in accordance with the invention (curve G) is slightly higher than that of the reference cell (curve H) and that it extends further. This is a very appreciable advantage.

Other oxides which are or are not electrochemically reducible can be inserted in the vitreous active materials in accordance with the invention to improve any aspect of the operations of the cells. Of course, it is also possible to modify the relative proportions of the main ingredients such as $Bi_2O_3$ and PbO or $Bi_2O_3$ and CuO. However, in the case of $Bi_2O_3$ and CuO, if the molar ratio between CuO and $Bi_2O_3$ substantially exceeds 1 without any additives other than $SiO_2$, crystallized CuO is separated. Also, since $Bi_2O_3$ is electrochemically less advantageous, it is not advantageous for said ratio to be too small. The minimum quantity of $SiO_2$ required to obtain a vitreous structure depends on the nature and on the relative proportions of the other ingredients. By way of an example, a vitreous structure can be obtained by melting copper bismuthate with silica, the proportion of silica being at least about 7% by weight.

The active materials in accordance with the invention can be prepared very simply by melting the silica and the other ingredients together (either in the form of simple oxides such as $Bi_2O_3$, PbO and CuO or in the form of mixed oxides such as $Bi_2Pb_2O_5$ or $CuBi_2O_4$) and by rapidly cooling the molten bath, e.g. by casting it on a cold substrate; the glass is then crushed.

We claim:

1. An electric cell having a negative electrode, a positive electrode, and a non-aqueous electrolyte which is liquid at ordinary temperatures and pressures, said positive electrode comprising an active material consisting of a vitreous composition of a small quantity of silica and at least one electrochemically reducible metal oxide.

2. An electric cell according to claim 1, wherein said vitreous composition results from melting a small quantity of silica with a greater quantity in weight of lead oxide.

3. An electric cell according to claim 1, wherein said vitreous composition results from melting a small quantity of silica with a greater quantity, in total weight, of lead oxide and at least one other reducible oxide.

4. An electric cell according to claim 3, wherein said other oxide comprises bismuth oxide.

5. An electric cell according to claims 2, 3, or 4, wherein said vitreous composition additionally comprises a small quantity of chromium oxide.

6. An electric cell according to claim 1, wherein said oxide comprises copper oxide CuO and bismuth oxide $Bi_2O_3$ in the proportion of at least about one molecule of $Bi_2O_3$ to one molecule of CuO.

7. An electric cell according to claim 6, wherein said proportion is about one molecule of $Bi_2O_3$ for one molecule of CuO.

8. An electric cell according to claims 1, 2, 3, 4, 6, or 7, wherein said negative electrode is based on an alkali or an alkali-earth metal.

9. An electric cell according to claim 8, wherein said electrolyte is a solution of at least one salt in at least one organic solvent.

* * * * *